No. 684,084. Patented Oct. 8, 1901.
O. B. MUELLER.
SERVICE CLAMP.
(Application filed June 3, 1901.)
(No Model.)
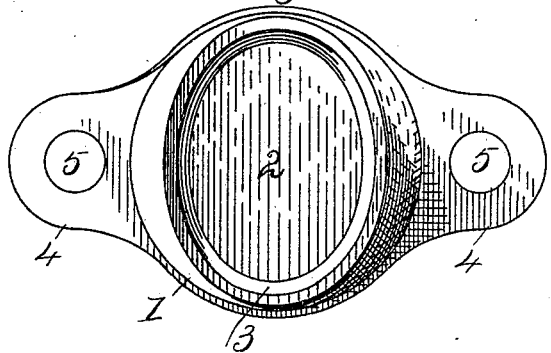
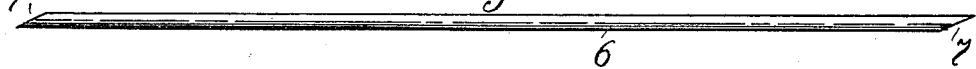
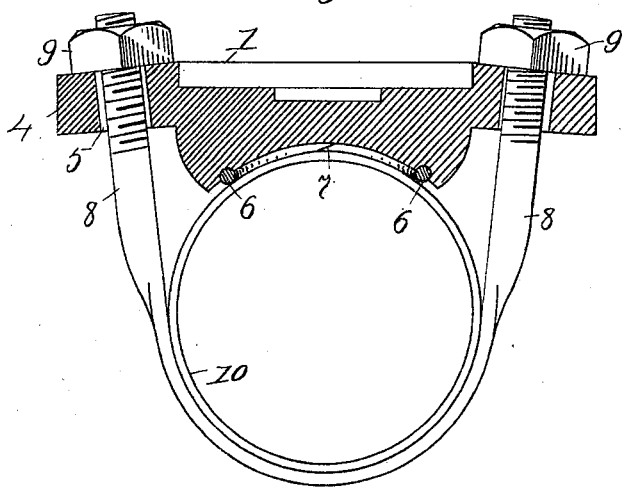
Witnesses.
Ina C. Graham.
Nora Graham.
Inventor.
Oscar B. Mueller.
by L. R. Graham
his attorney.

UNITED STATES PATENT OFFICE.

OSCAR B. MUELLER, OF DECATUR, ILLINOIS, ASSIGNOR TO H. MUELLER MANUFACTURING COMPANY, INCORPORATED, OF SAME PLACE.

SERVICE-CLAMP.

SPECIFICATION forming part of Letters Patent No. 684,084, dated October 8, 1901.

Application filed June 3, 1901. Serial No. 62,846. (No model.)

*To all whom it may concern:*

Be it known that I, OSCAR B. MUELLER, of the city of Decatur, county of Macon, and State of Illinois, have invented certain new and useful Improvements in Service-Clamps, of which the following is a specification.

This invention relates to metal saddles permanently clamped to thin pipe for the purpose of providing substantial bearings for cocks; and its object is to provide means for readily making permanent close connections between the saddles and the pipe.

The invention is exemplified in the structure hereinafter described, and it is defined in the appended claims.

The surface of water and gas pipe is somewhat rough and irregular. The saddles are of unfinished cast metal, and it is therefore necessary to interpose something between the saddles and the pipe to make close fits. Rubber gaskets have the yielding properties necessary to equalize the inequalities of surface or to compensate for the irregularities by conforming thereto; but they are hardly durable enough to form part of a permanent attachment to the pipe. Lead is sufficiently durable, but when used in flat gasket form it does not yield or rearrange its particles with sufficient readiness to give best results in the formation of tight joints. These are the conditions my invention is designed to meet.

In the drawings forming part of this specification, Figure 1 is a plan of the bearing-surface of the metal saddle of a service-clamp. Fig. 2 is a representation of the strip of lead out of which a gasket or packing is formed. Fig. 3 is a section lengthwise through the clamp and crosswise through the pipe to which the clamp is connected.

In Fig. 3 the clamp is shown attached to the pipe, the gasket or packing-strip is interposed between the pipe, and the saddle and all is in readiness to so compress the packing-ring as to make it conform to the irregularities of surface of the pipe and the saddle. The clamp-saddle 1 has the concave surface 2, that approximately conforms to the surface of the pipe to which it is to be connected, and in the concaved surface of the saddle is formed a continuous groove 3. Lugs 4 are formed on opposite sides of the clamp, and they are provided with bolt-holes, as 5. A clamp-strap 8 embraces a pipe 10. The ends of the strap are rounded, threaded, and extended through the holes 5 in the lugs of the clamp-saddle, and nuts 9 are screwed onto the protruding ends of the strap. The gasket, packing, or joint-former is made of a strip of lead, as 6, which is preferably circular in cross-section. The ends of the strip are beveled, as shown at 7, so as to overlap, and the length of the strip, exclusive of one of the beveled ends, is equal to the circumference of the groove 3 of the saddle. The piece of lead is placed in the groove of the saddle, with its ends overlapping, as shown in Fig. 3. The clamp is secured to the pipe, with the lead interposed between the pipe and the saddle, and the nuts of the clamp-strap are tightened until the lead is made to conform to the inequalities of the opposing surface and forms a joint sufficiently tight to hold the contents of the pipe.

In making a joint a piece is cut off a reel or bundle of round lead of a length to fill the groove of the clamp and provide for an overlap. The ends of the piece are beveled on opposite sides. The piece is then straightened by rolling it between two flat surfaces or in any other desirable manner and is laid in the groove of the saddle, with its beveled ends overlapping. If the beveled surfaces of the ends should not properly coincide when brought together, the lead may be easily twisted to bring the parts into proper correlation. When the saddle is attached to the pipe, the lead may be compressed by adding concussion to the stress of the nuts, a block of hard wood being placed on the saddle to take the blows of a hammer.

The lead is preferably circular in cross-section, because all the diameters of a circle are equal, and the nearer this condition exists in the lead strip of which the joint is formed the easier the lead can be adapted to the groove of the saddle and its ends overlapped and the more uniform will be the thickness of lead subjected to pressure between the saddle and the pipe. Strips of lead truly polygonal in cross-section would make joints nearly as effectively as circular lead does, and the greater the number of the sides of the polygon the more nearly perfect will be the result. An octagonal strip may be twisted somewhat without materially altering the arrangement of lead between the saddle and the pipe. A strip of lead triangular in cross-section would be somewhat disarranged by twisting as regards diameters; but even with this simplest of the polygonal forms the lead would be reasonably effective.

When the saddle is clamped to the pipe, the saddle and the pipe may be drilled and tapped inside the lead joint-strip, and a cock may be inserted for permanent use.

I claim—

1. The combination with a clamp-saddle, of a gasket formed of a strip of soft metal approximately circular in cross-section, such strip having its ends beveled and overlapped, substantially as described.

2. The combination with a clamp-saddle having a groove circularly traversing its concave bearing-surface, and a strip of soft metal approximately circular in cross-section and with beveled ends, the said strip being laid in the groove of the saddle with the ends overlapping, substantially as described.

In testimony whereof I sign my name in the presence of two subscribing witnesses.

OSCAR B. MUELLER.

Witnesses:
ABNER M. WIDICK,
E. L. AUER.